United States Patent [19]
Watanabe et al.

[11] Patent Number: 6,119,721
[45] Date of Patent: Sep. 19, 2000

[54] ELECTROPNEUMATIC REGULATOR SYSTEM

[75] Inventors: Tadao Watanabe, Ibaraki-ken; Yuji Tsuda, Kashiwa, both of Japan

[73] Assignee: SMC Kabushiki Kaisha, Tokyo, Japan

[21] Appl. No.: 09/210,762

[22] Filed: Dec. 14, 1998

[30] Foreign Application Priority Data

Dec. 22, 1997 [JP] Japan ..................... 9-353709

[51] Int. Cl.[7] .............. F16K 31/12; G05D 7/06
[52] U.S. Cl. ........................ 137/487.5; 700/282
[58] Field of Search .......... 137/487.5; 700/282

[56] References Cited

U.S. PATENT DOCUMENTS

| | | |
|---|---|---|
| 4,217,647 | 8/1980 | Sjoholm et al. . |
| 4,446,523 | 5/1984 | Reinke ..................... 700/282 |
| 5,132,904 | 7/1992 | Lamp ..................... 364/422 |
| 5,469,749 | 11/1995 | Shimada et al. . |

FOREIGN PATENT DOCUMENTS

| | | |
|---|---|---|
| 0 834 723 A1 | 1/1998 | European Pat. Off. . |
| 0 834 723 | 4/1998 | European Pat. Off. . |
| 1 310 411 | 3/1973 | United Kingdom . |
| 1 344 619 | 1/1974 | United Kingdom . |
| 1 422 697 | 1/1976 | United Kingdom . |
| 2 097 555 A | 11/1982 | United Kingdom . |
| 2 172 725 | 9/1986 | United Kingdom . |
| 2 172 725 A | 9/1986 | United Kingdom . |
| 2 271 491 | 4/1994 | United Kingdom . |
| 2 271 491 A | 4/1994 | United Kingdom . |

*Primary Examiner*—Denise L. Ferensic
*Assistant Examiner*—Ken Rinehart
*Attorney, Agent, or Firm*—Oblon, Spivak, McClelland, Maier & Neustadt, P.C.

[57] ABSTRACT

An electropneumatic regulator system, which has an electropneumatic regulator for controlling a pressure and a flow rate of a fluid supplied from a fluid source on the basis of a level of an input signal, comprises a communication unit for making communication with a master station, and a control unit for controlling the electropneumatic regulator in response to at least the contents of communication data received by the communication unit. Accordingly, it is possible to collectively control one or more electropneumatic regulators by using, for example, the master station on the basis of the communication so that the response performance can be improved for the remote control of the electropneumatic regulators, and the cost can be reduced.

10 Claims, 9 Drawing Sheets

FIG. 6A  ▶ IN CASE OF P1<P2: WINDOW COMPARATOR MODE
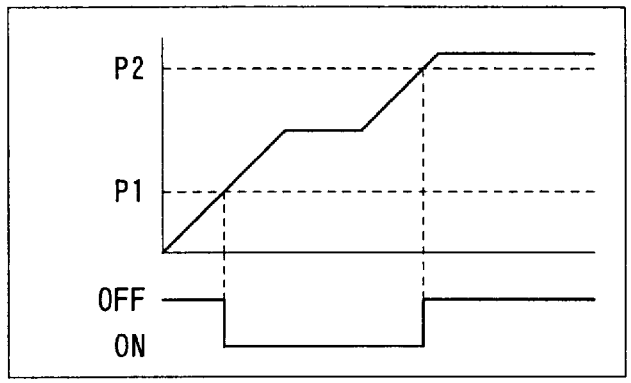
FIG. 6B  ▶ IN CASE OF P1≧P2: HYSTERESIS MODE
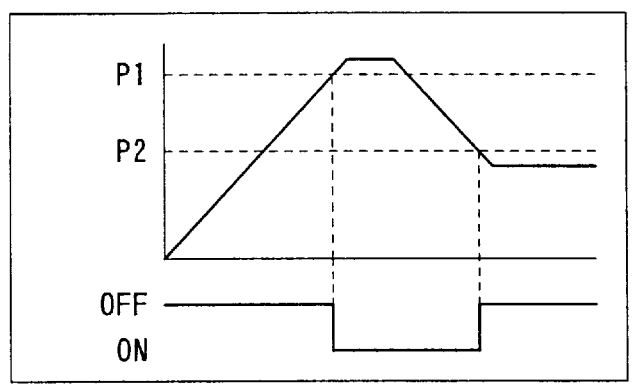
FIG. 6C  ▶ IN CASE OF P1=P2=0: SELF-DIAGNOSIS MODE
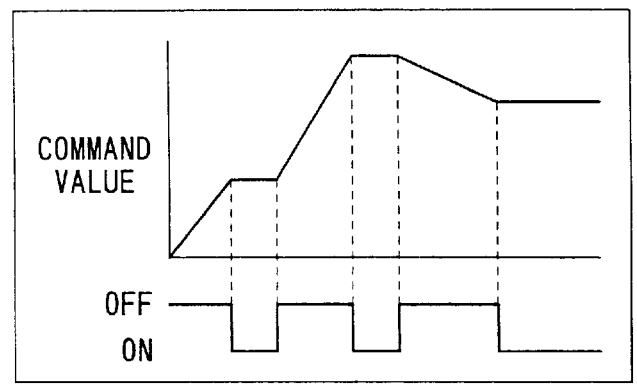

FIG. 9

| ADD+0 | TARGET PRESSURE | LOW-ORDER 8-BIT |
|---|---|---|
| ADD+1 | TARGET PRESSURE | HIGH-ORDER 8-BIT |
| ADD+2 | MINIMUM PRESSURE | LOW-ORDER 8-BIT |
| ADD+3 | MINIMUM PRESSURE | HIGH-ORDER 8-BIT |
| ADD+4 | MAXIMUM PRESSURE | LOW-ORDER 8-BIT |
| ADD+5 | MAXIMUM PRESSURE | HIGH-ORDER 8-BIT |
| ADD+6 | FIRST SWITCH OUTPUT | LOW-ORDER 8-BIT |
| ADD+7 | FIRST SWITCH OUTPUT | HIGH-ORDER 8-BIT |
| ADD+8 | SECOND SWITCH OUTPUT | LOW-ORDER 8-BIT |
| ADD+9 | SECOND SWITCH OUTPUT | HIGH-ORDER 8-BIT |
| ADD+10 | SECONDARY PRESSURE | LOW-ORDER 8-BIT |
| ADD+11 | SECONDARY PRESSURE | HIGH-ORDER 8-BIT |
| ADD+12 | RESULT OF SELF-DIAGNOSIS | ON/OFF = 1/0 |
| ADD+13 | RESULT OF SWITCH OUTPUT | ON/OFF = 1/0 |

ELECTROPNEUMATIC REGULATOR SYSTEM

BACKGROUND OF THE INVENTION

1. Field of the Invention

The present invention relates to an electropneumatic regulator system which makes it possible to perform remote control of an electropneumatic regulator, for example, by using a master station installed in a serial communication network.

2. Description of the Related Art

In general, the electropneumatic regulator controls the pressure and the flow rate of a fluid supplied from a fluid source, in response to the level of an input signal (a voltage signal or a current signal). Volumetric remote control or connection to a control unit such as PC or a computer makes it possible to control the flow rate and the pneumatic pressure of various types of actuators. Therefore, the electropneumatic regulator is widely applicable, for example, to the control of application of force for press die cushions, the multispeed control for cylinders, the control of application of force for electrodes of welding machines, the control of rotation for air motors, and the control of application of force for low pressure casting machines.

The electropneumatic regulator is previously subjected to the initial setting before the start of use. The initial setting includes, for example, the zero adjustment and the span adjustment as shown in FIG. 11. The zero adjustment is performed to change a basic state in which the output pressure is 0% when the input signal is 0% in order to establish another state in which the output pressure is generated with an offset to some extent. The span adjustment is performed in order to adjust the slope of the input and the output.

During the ordinary use, the operation is performed such that a control unit (for example, a computer), which is exclusively equipped for the electropneumatic regulator, is used to output a pressure command signal to the electropneumatic regulator.

In order to realize, for example, the multifunctional operation for various types of systems based on the use of the electropneumatic regulator, a multi-stage electropneumatic regulator system is used, or a large number of electropneumatic regulators are dispersed over a large system in some cases.

In such a case, the following methods are conceived when the individual electropneumatic regulators are controlled by using exclusively equipped control units respectively. That is, operators are arranged at a plurality of points at which the control units are installed respectively, or an operator goes around the plurality of points to perform the control.

However, the former method involves a problem that the cost is extremely expensive, and such a method is not practical. The latter method involves a problem that it is impossible to perform the control in real time.

SUMMARY OF THE INVENTION

The present invention has been made taking such problems into consideration, an object of which is to provide an electropneumatic regulator system which makes it possible to collectively control one or more electropneumatic regulators by using, for example, a master station on the basis of communication so that the response performance may be improved for the remote control of the electropneumatic regulators, and the cost may be reduced.

The present invention lies in an electropneumatic regulator system comprising an electropneumatic regulator for controlling a pressure and a flow rate of a fluid supplied from a fluid source, on the basis of a level of an input electric signal, the electropneumatic regulator system comprising a communication unit for making communication with an external device, and a control unit for controlling the electropneumatic regulator depending on at least contents of communication data received by the communication unit.

Accordingly, one or more electropneumatic regulators can be collectively controlled by means of communication effected, for example, by a master station. Thus, the response performance can be improved, and the cost can be reduced for the remote control of the electropneumatic regulator. As a result, it is possible to realize the multifunctional operation for various types of systems based on the use of the electropneumatic regulator. Further, it is easy to perform the real time control of a system comprising a large number of electropneumatic regulators dispersed therein.

In a preferred embodiment, the communication unit designates an address corresponding to a setting attribute contained in the communication data so that actual data contained in the communication data is transmitted to the control unit, and the control unit stores the actual data contained in the communication data, in the address designated by the communication unit, in a storage region in a memory so that the electropneumatic regulator is controlled on the basis of the actual data stored in the memory.

In another preferred embodiment, when the electropneumatic regulator is subjected to initial setting, the control unit performs the initial setting for the electropneumatic regulator on the basis of the actual data stored in the address concerning the initial setting in the storage region in the memory.

In still another preferred embodiment, when the electropneumatic regulator is subjected to ordinary use, the control unit controls the electropneumatic regulator on the basis of the actual data stored in the address concerning a target value in the storage region in the memory.

In still another preferred embodiment, the control unit receives a result of control effected by the electropneumatic regulator to store it in a predetermined address in a storage region in a memory, and the communication unit reads the result of control stored in the predetermined address so that communication data corresponding to the result of control is prepared to transmit it to the external device.

In this embodiment, the result of control may be communicated to the external device periodically or in response to an external request.

The system may be specifically constructed such that the communication unit comprises a data-receiving means for receiving the communication data from the external device, an address-designating means for designating the address corresponding to the setting attribute contained in the received communication data, and a data output means for transmitting, to the control unit, the designated address and the actual data contained in the communication data, and the control unit comprises a data-receiving means for receiving the designated address and the actual data from the communication unit, a data-storing means for storing the actual data in the designated address in the storage region in the memory, and a control means for controlling the electropneumatic regulator on the basis of the actual data stored in the memory.

Preferably, in addition to the arrangement described above, the system is constructed such that the control unit comprises a control result-reading means for reading a result of control effected by the electropneumatic regulator to store it in a predetermined address in the memory, and a control result output means for reading the result of control from the memory to transmit it to the communication unit, and the communication unit comprises a control result-receiving means for receiving the result of control transmitted from the control result output means of the control unit, a communication data-preparing means for preparing communication data corresponding to the received result of control, and a data-transmitting means for transmitting the prepared communication data to the external device.

Preferably, the external device may be connected to the communication unit via a serial communication bus. In this embodiment, it is preferable that an identification code for indicating the individual electropneumatic regulator is contained in communication data transmitted from the external device, and the communication unit receives the communication data when the identification code contained in the communication data coincides with the identification code of the electropneumatic regulator.

In still another preferred embodiment, the communication unit performs serial/parallel conversion for the communication data transmitted from the external device to process the data, and the communication unit performs serial/parallel conversion for communication data prepared in the communication unit to transmit it to the external device.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6A illustrates a window comparator mode;

FIG. 6B illustrates a hysteresis mode;

FIG. 6C illustrates a self-diagnosis mode;

FIG. 9 illustrates the contents of a working region of an internal memory;

DESCRIPTION OF THE PREFERRED EMBODIMENTS

Explanation will be made below with reference to FIGS. 1 to 10 for an illustrative embodiment of the electropneumatic regulator system according to the present invention (hereinafter simply referred to as "electropneumatic regulator system according to the embodiment").

Figure 1:
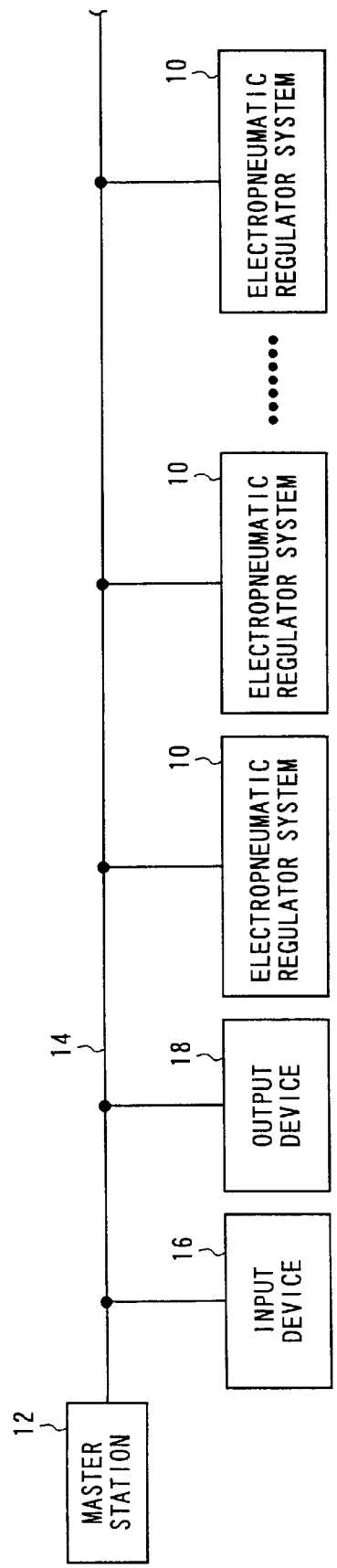
FIG. 1 shows an exemplary arrangement illustrating a form of the use of an electropneumatic regulator system according to an embodiment of the present invention.

At first, for example, a form of the use of the electropneumatic regulator system 10 according to the embodiment of the present invention is shown in FIG. 1. In this form, one or more electropneumatic regulator systems 10 according to the embodiment of the present invention are connected to a serial communication bus 14 extending from a master station 12, in addition to an input device 16 and an output device 18. The electropneumatic regulator systems 10 are controlled on the basis of communication effected by the master station 12.

In this embodiment, the input device 16 is a general-purpose apparatus for incorporating ON-OFF signals supplied from various types of sensors. The output device 18 is a general-purpose apparatus for exactly outputting, via transistors and relays, ON-OFF signals transmitted via the serial communication bus 14. Those specified in conformity with the serial communication bus 14 are provided for any of the input device 16 and the output device 18. Those usable as the serial communication bus 14 include, for example, the device net, the field bus, and the JEMA-Net.

Next, explanation will be made with reference to FIGS. 2 to 10 for the arrangement of one electropneumatic regulator system 10.

Figure 2:
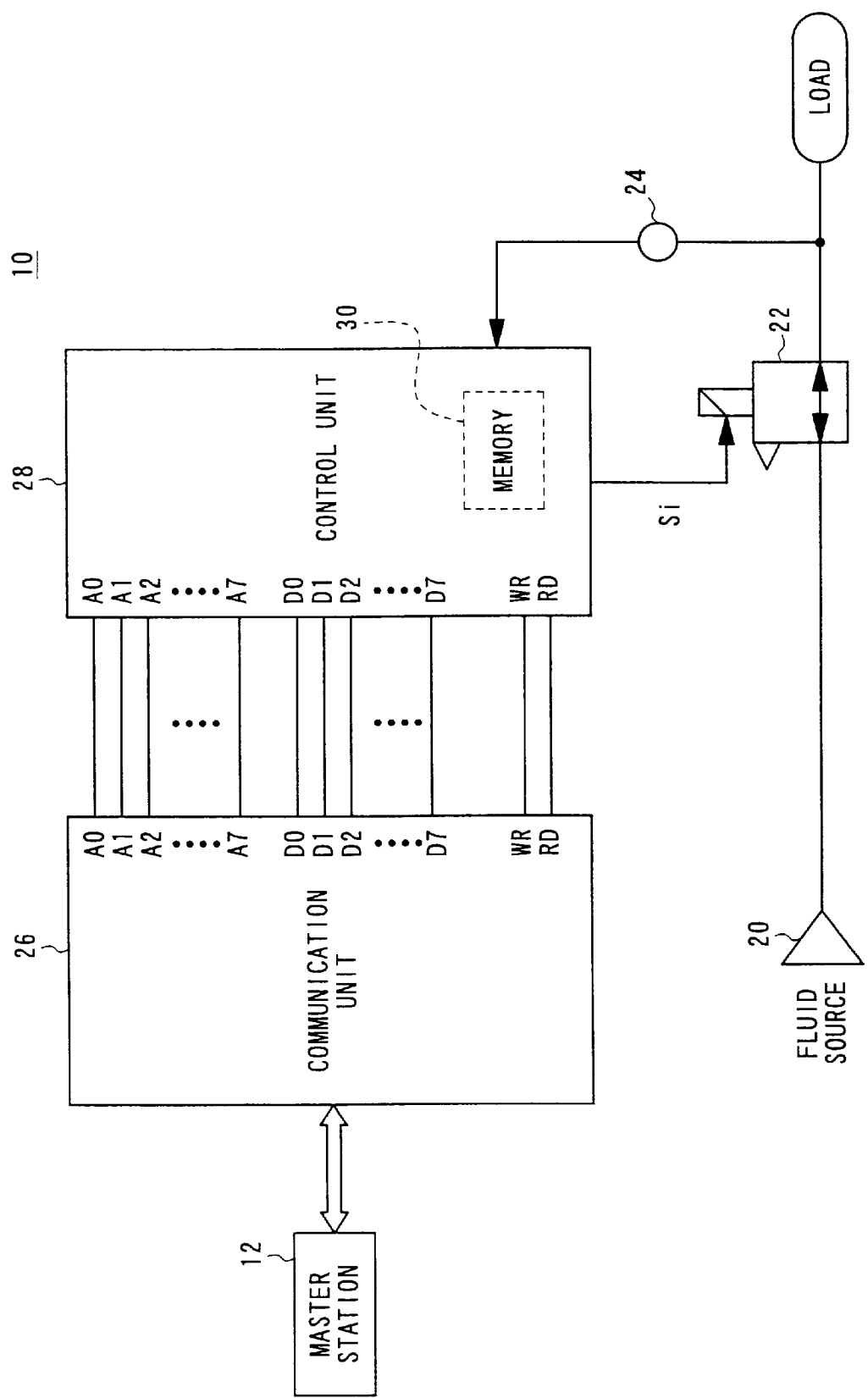
FIG. 2 shows an arrangement of the electropneumatic regulator system according to the embodiment of the present invention.

As shown in FIG. 2, the electropneumatic regulator system 10 comprises an electropneumatic regulator 22 for controlling the pressure and the flow rate of a fluid supplied from a fluid source 20, on the basis of the level of an input signal (a voltage signal or a current signal) Si, a pressure sensor 24 for detecting the secondary is pressure outputted from the electropneumatic regulator 22, a communication unit 26 for making communication with the external master station 12, and a control unit 28 for controlling the electropneumatic regulator 22 in response to at least the contents of communication data received by the communication unit 26 and the secondary pressure supplied from the pressure sensor 24. The control unit 28 includes therein an internal memory 30 for storing, for example, actual data handled by the control unit 28 (see FIG. 8).

Figure 4:
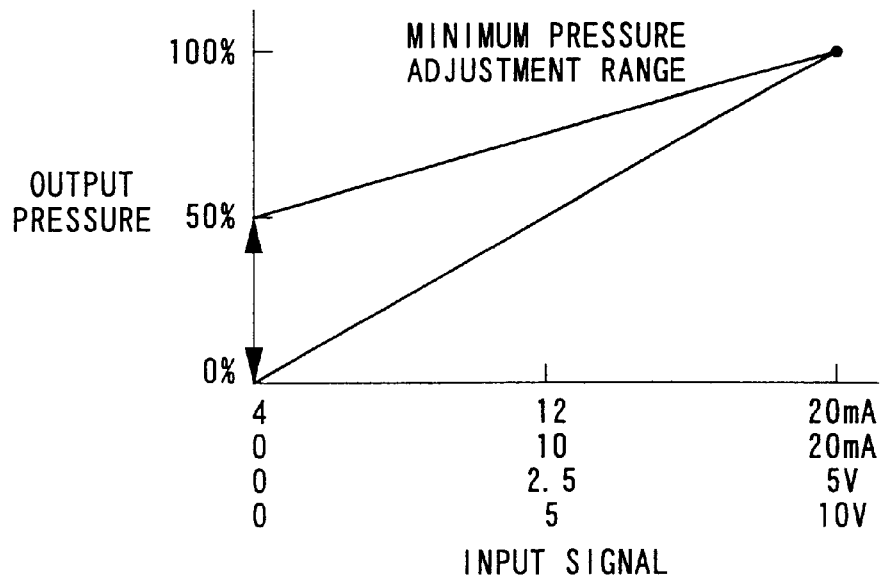
FIG. 4 illustrates minimum pressure setting.

The level of the input signal Si, which is supplied to the electropneumatic regulator 22, differs depending on the type of the electropneumatic regulator 22. As shown in FIG. 4, for example, the level of the input signal Si includes those ranging from 4 to 20 mA, from 0 to 20 mA, from 0 to 5 V, and from 0 to 10 V.

The communication unit 26 and the control unit 28 are constructed by microcomputers respectively. The communication unit 26 and the control unit 28 are connected in parallel to one another via eight address lines A0 to A7, eight data lines D0 to D7, one write signal line WR, and one read signal line RD.

It is noted that the enable state for the read signal RD and the write signal WR may include those at the low level as well as those at the high level. Therefore, in the following description, the fact, which is referred to mean that the read signal RD and the write signal WR are enabled, is uniformly referred to by using expressions of "flag is set for the read signal RD" and "flag is set for the write signal WR".

The control unit 28 also has a function of a memory controller for the internal memory 30. Therefore, when the data is written into the internal memory 30 from the communication unit 26 via the control unit 30, then the address, in which the data is to be written, is firstly supplied in the communication unit 26 to the address lines A0 to A7, and the flag is set for the write signal WR. When the flag for the write signal WR is received, then the control unit 28 reads the address via the address lines A0 to A7, and the flag is set for the read line RD.

When the read signal RD is detected (when the flag for the read signal RD is received), the communication unit 26 supplies the data to be sent at present, to the data lines D0 to D7. The control unit 28 receives the data via the data lines D0 to D7, and it writes the data into the read address in the storage area of the internal memory 30. Successive repetition of the series of operations described above makes it possible to write the data into the concerning addresses in the internal memory 30.

Explanation will now be made with reference to FIGS. 3 to 7 for the format of the communication data used for the electropneumatic regulator system 10 according to the embodiment of the present invention.

Figure 3:
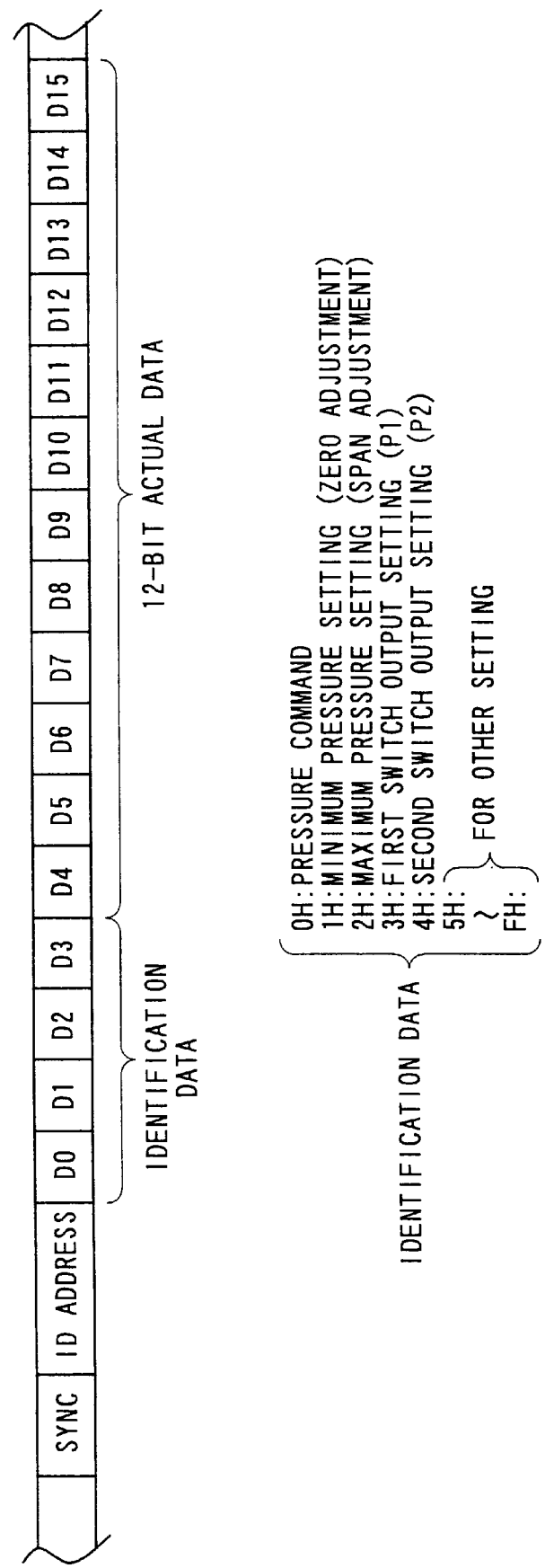
FIG. 3 illustrates a format of receiving data.

At first, as shown in FIG. 3, the communication data, i.e., the receiving data, which is transmitted from the is master station and which is received by the specified electropneumatic regulator system 10, comprises, a SYNC code for taking synchronization, an ID address for specifying the electropneumatic regulator system 10, 4-bit identification data, and 12-bit actual data, from the head in this order. As shown in FIG. 3, the identification data of the receiving data comprises, for example, a pressure command of 0H="0000", minimum pressure setting (zero adjustment) of 1H="0001", maximum pressure setting (span adjustment) of 2H="0010", first switch output setting (P1) of 3H="0011", and second switch output setting (P2) of 4H="0100". The remaining 5H="0101"to FH="1111" are used for other setting.

As shown in FIG. 4, the minimum pressure setting is provided to set the output (the secondary pressure) of the electropneumatic regulator 22 to be obtained when the input signal is 0%. The performance to response to the load can be made quick by increasing the minimum pressure to be larger than 0%. In this embodiment, the minimum pressure can be set within a range of 0 to 50%.

Figure 5:
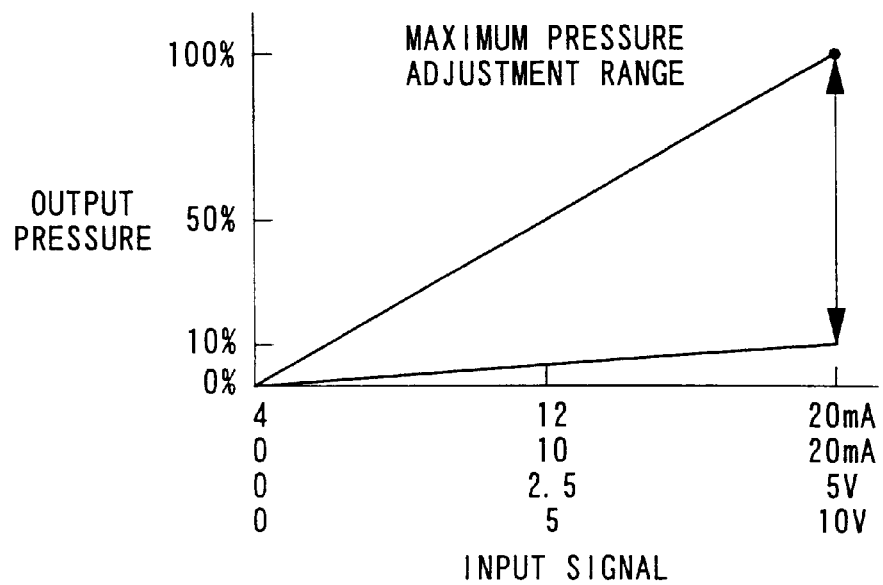
FIG. 5 illustrates maximum pressure setting.

As shown in FIG. 5, the maximum pressure setting is provided to set the output (the secondary pressure) of the electropneumatic regulator 22 to be obtained when the input signal is 100%. The sensitivity of the electropneumatic regulator 22 is determined by the minimum pressure and the maximum pressure. In this embodiment, the maximum pressure can be set within a range of 10 to 100%.

The setting for the first and second switch outputs P1, P2 is provided to select any one of three modes (window comparator mode, hysteresis mode, and self-diagnosis mode) as shown in FIGS. 6A to 6C. In the case of P1<P2, the window comparator mode (see FIG. 6A) is selected. In the case of P1≧P2, the hysteresis mode (see FIG. 6B) is selected. In the case of P1=P2=0, the self-diagnosis mode (see FIG. 6C) is selected.

Next, explanation will be made for the processing operations performed in the respective modes in the control unit 28. At first, as shown in FIG. 6A, the control unit 28 outputs the following signals in the window comparator mode in accordance with the passage of time. That is, a signal indicating "switch output OFF" is outputted during a period in which the output (the secondary pressure) of the electropneumatic regulator 22 is smaller than the pressure indicated by the first switch output P1. A signal indicating "switch output ON" is outputted at a point of time at which the secondary pressure is not less than the pressure indicated by the first switch output P1. A signal indicating "switch output OFF" is outputted at a point of time at which the secondary pressure is not less than the pressure indicated by the second switch output P2.

As shown in FIG. 6B, the control unit 28 outputs the following signals in the hysteresis mode in accordance with the passage of time. That is, a signal indicating "switch output OFF" is outputted during a period in which the output (the secondary pressure) of the electropneumatic regulator 22 is smaller than the pressure indicated by the first switch output P1. A signal indicating "switch output ON" is outputted at a point of time at which the secondary pressure is not less than the pressure indicated by the first switch output P1. A signal indicating "switch output OFF" is outputted at a point of time at which the secondary pressure is decreased to be not more than the pressure indicated by the second switch output P2.

As shown in FIG. 6C, the control unit 28 outputs the following signals in the self-diagnosis mode. That is, a signal indicating "switch output OFF" is outputted during a period in which the secondary pressure is smaller than a designated pressure (a pressure designated by the master station 12). A signal indicating "switch output ON" is outputted at a point of time at which the secondary pressure arrives at the designated pressure. The self-diagnosis mode makes it possible to diagnose whether or not the electropneumatic regulator 22 functions normally, and diagnose, for example, the response speed of the electropneumatic regulator 22.

Figure 7:
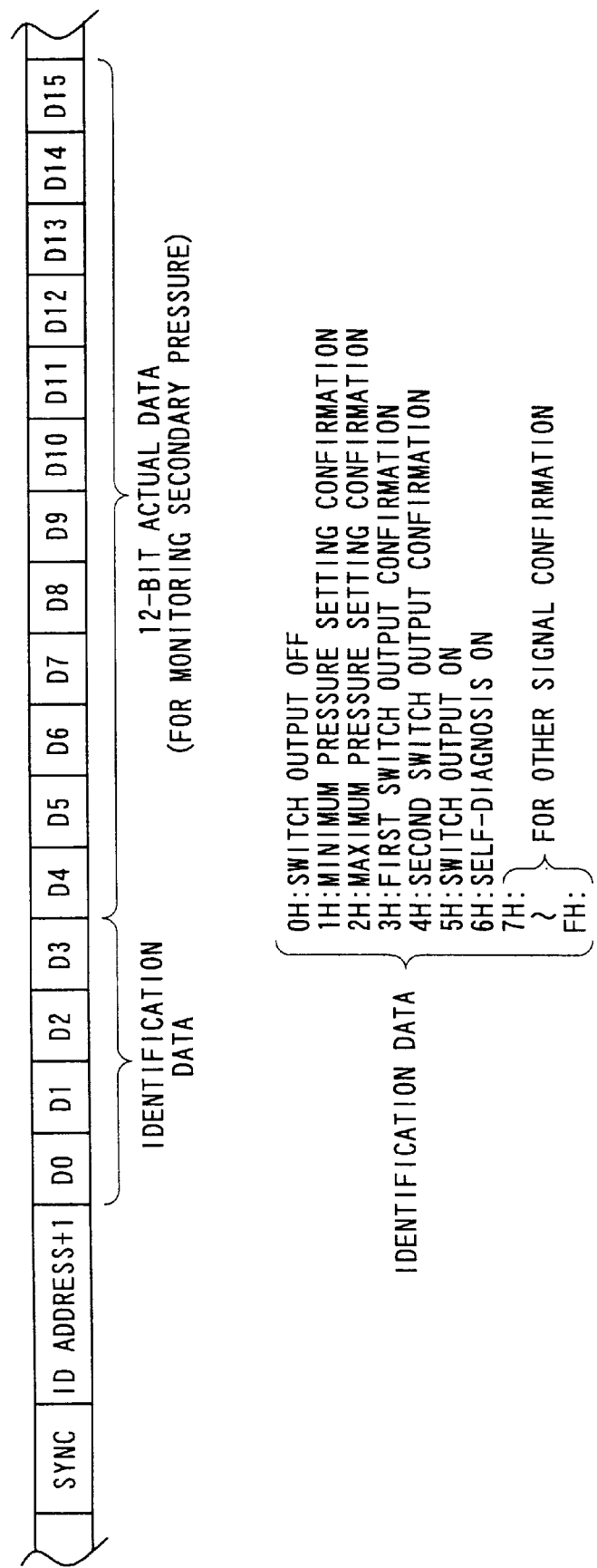
FIG. 7 illustrates a format of transmitting data.

On the other hand, as shown in FIG. 7, the communication data, i.e., the transmitting data, which is transmitted from the specified electropneumatic regulator system 10 to the master station 12, comprises, a SYNC code for taking synchronization, a transmitting (returning) ID address for specifying the electropneumatic regulator system is 10, 4-bit identification data, and 12-bit actual data, from the head in this order. The transmitting ID address differs depending on the communication protocol to be used. However, in this embodiment, "ID address of receiving data +1" is used. The 12-bit actual data is used to monitor the secondary pressure.

As shown in FIG. 7, the identification data of the transmitting data comprises, for example, switch output OFF of 0H="0000", minimum pressure setting confirmation of 1H="0001", maximum pressure setting confirmation of 2H="0010", first switch output setting confirmation of 3H="0011", second switch output setting confirmation of 4H="0100", switch output ON of 5H="0101", and self-diagnosis ON of 6H="0110". The remaining 7H="0111" to FH="1111" are used for other signal confirmation.

Next, explanation will be made with reference to FIGS. 8 to 10 for the communication unit 26 and the control unit 28 for constructing the electropneumatic regulator system 10.

Figure 8:
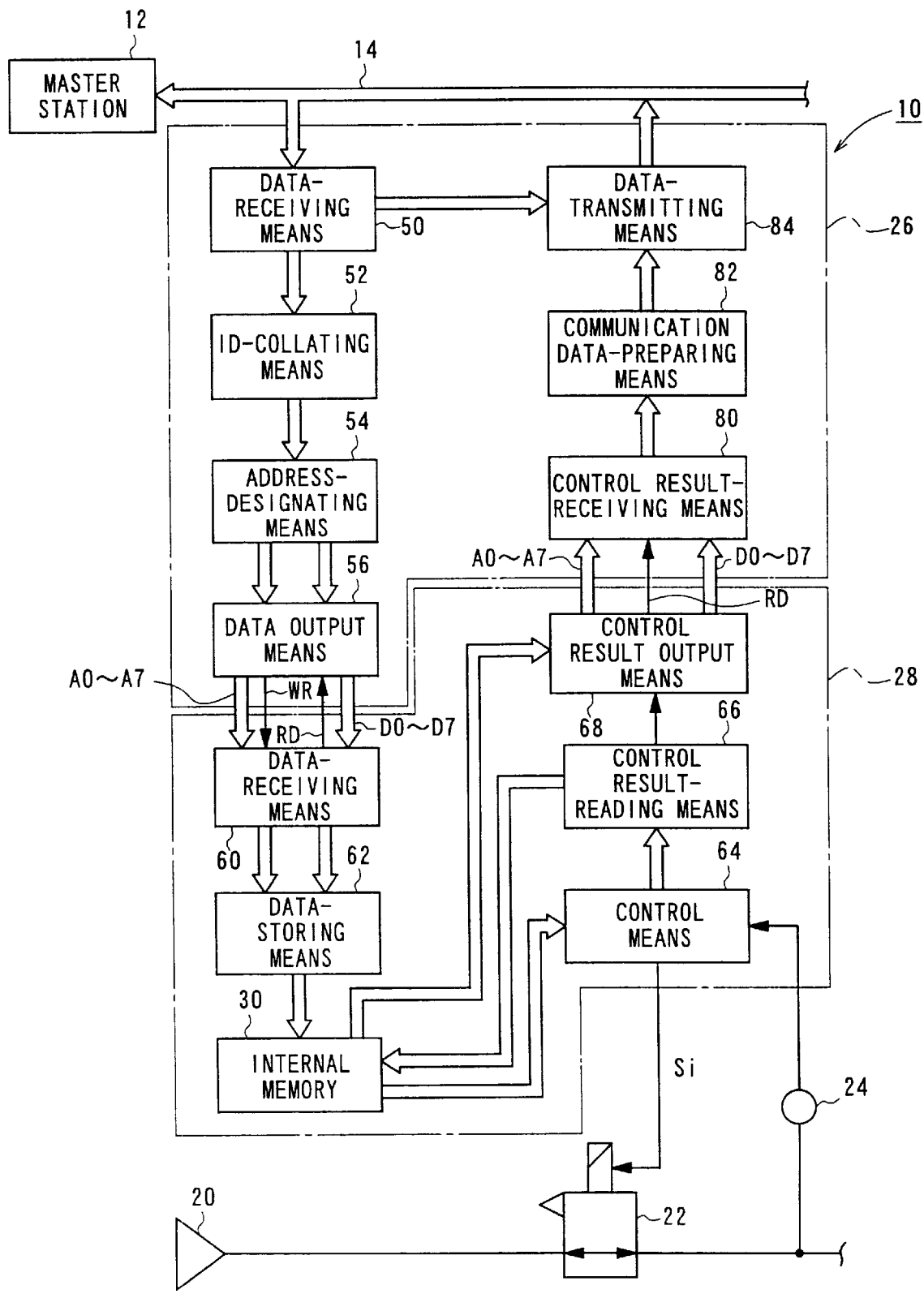
FIG. 8 shows a functional block diagram illustrating the arrangement of the electropneumatic regulator system according to the embodiment of the present invention.

At first, as shown in FIG. 8, the communication unit 26 comprises a data-receiving means 50 for receiving the communication data from the external device, an ID-collating means 52 for making collation for whether or not the received communication data relates to the concerning electropneumatic regulator system 10 on the basis of the ID address contained in the communication data, an address-designating means 54 for designating the address corresponding to the identification data in the storage region in the internal memory 30 of the control unit 28, and a data output means 56 for transmitting the designated address and the actual data contained in the communication data to the control unit 28.

On the other hand, as shown in FIG. 8, the control unit 28 comprises a data-receiving means 60 for receiving the designated address and the actual data from the communication unit 26, a data-storing means 62 for storing the actual data in the designated address in the storage region of the internal memory 30, and a control means 64 for controlling the electropneumatic regulator 22 on the basis of the actual data stored in the internal memory 30 and the secondary pressure supplied from the pressure sensor 24.

In addition to the various means described above, the control unit 28 further comprises a control result-reading means 66 for reading the result of control (for example, the secondary pressure and the switch output) effected by the electropneumatic regulator 22 and storing it in the predetermined address in the internal memory 30, and a control result output means 68 for reading the result of control from the internal memory 30 and transmitting it to the communication unit 26.

In addition to the various means described above, the communication unit 26 further comprises a control result-receiving means 80 for receiving the result of control from the control result output means 68 of the control unit 28, a communication data-preparing means 82 for preparing the communication data corresponding to the received result of control, and a data-transmitting means 84 for transmitting the prepared communication data to the external device.

The internal memory 30 is composed of, for example, SRAM or DRAM. A certain range of the storage region is logically allotted as an area for storing the actual data and the result of control.

The contents are shown, for example, in FIG. 9. That is, the data indicating the target value determined by the pressure command is stored in an area (ADD+0 and ADD+1) corresponding to 2 bytes starting from the head address (ADD). The data indicating the minimum pressure is stored in an area (ADD+2 and ADD+3) corresponding to 2 bytes starting from the next address (ADD+2). The data indicating the maximum pressure is stored in an area (ADD+4 and ADD+5) corresponding to 2 bytes starting from the next address (ADD+4). The data indicating the first switch output is stored in an area (ADD+6 and ADD+7) corresponding to 2 bytes starting from the next address (ADD+6). The data indicating the second switch output is stored in an area (ADD+8 and ADD+9) corresponding to 2 bytes starting from the next address (ADD+8).

The data indicating the secondary pressure supplied from the pressure sensor is stored in an area (ADD+10 and ADD+11) corresponding to 2 bytes starting from the eleventh address (ADD+10) as counted from the head address. The data indicating the result of self-diagnosis is stored in an area corresponding to 1 byte starting from the next address (ADD+12). The data indicating the result of switch output is stored in an area corresponding to 1 byte starting from the next address (ADD+13). Next, explanation will be made with reference to FIGS. 8 to 10 for the processing operation of the electropneumatic regulator system 10 according to the embodiment of the present invention, especially for the initial setting process for the electropneumatic regulator 22.

Figure 10:
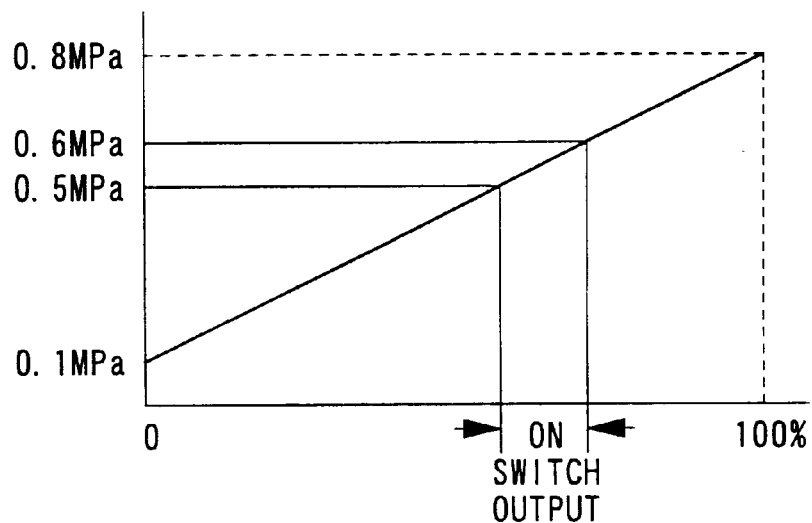
FIG. 10 illustrates an example of initial setting.
Figure 11:
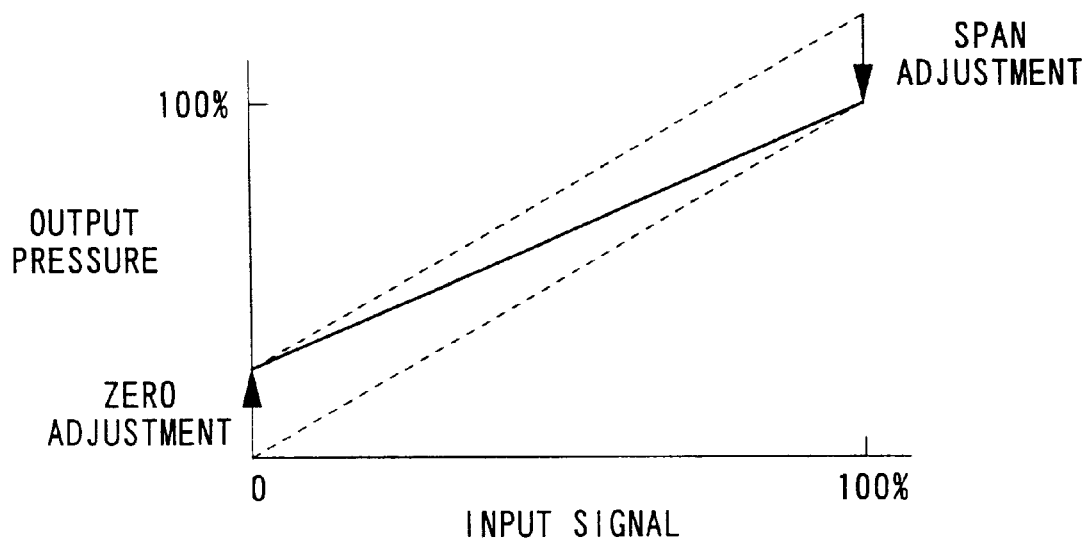
FIG. 11 generally illustrates the zero adjustment and the span adjustment for the electropneumatic regulator.

For example, as shown in FIG. 10, the following initial setting is assumed. That is, the mode is set to be the window comparator mode in which the minimum pressure is 0.1 MPa, the maximum pressure is 0.8 MPa, the first switch output is 0.5 MPa, and the second switch output is 0.6 MPa.

When the pressure range of 0 to 1.0 MPa is represented by 12-bit resolution, 1 bit corresponds to 0.2 kPa. Therefore, the following expressions hold.

0.1 MPa=0199H 0.5 MPa=0800H 0.6 MPa=0999H 0.8 MPa=0CCCH

The user operates the input device 16 (see FIG. 1) to input a value which indicates the minimum pressure and the ID address of the electropneumatic regulator system 10 to which the data is sent. The input data is transmitted to the master station 12 via the serial communication bus 14. The data is converted into the communication data in the master station 12.

Specifically, the communication data is prepared, which has the SYNC code at its head followed by the ID address of the electropneumatic regulator system 10 designated by the user and the identification data "1H" indicating the minimum pressure setting added thereto and followed by the actual data "199H" indicating 0.1 MPa added thereto. The 16-bit array data represented by the identification data and the actual data is 1199H. Next, the master station 12 transmits the communication data to the respective electropneumatic regulator systems 10 via the serial communication bus 14. Each of the electropneumatic regulator systems 10 incorporates the transmitted communication data via the data-receiving means 50 of the communication unit 26, and it sends the data to the ID-collating means 52 disposed at the downstream stage. The ID-collating means 52 extracts the ID address contained in the sent communication data to make collation with the ID address individually registered. If it is judged that the ID addresses are not coincident with each other as a result of the collation, then the incorporation of the communication data is stopped, and the system waits for arrival of the next communication data.

On the other hand, if it is judged in the collation process effected by the ID-collating means 52 that the ID addresses are coincident with each other, the identification code and the actual data are sent to the address-designating means 54 disposed at the downstream stage. The address-designating means 54 designates the 8-bit address corresponding to the identification data, in the storage region of the internal memory 30. Specifically, the address (the relative address) in the internal memory 30 is designated in accordance with the following correspondence. In this case, 02H is designated as the relative address for the minimum pressure setting.

TABLE 1

| Identification data | Relative address | Remarks |
| --- | --- | --- |
| 1H | 2H | minimum pressure setting |
| 2H | 4H | maximum pressure setting |
| 3H | 6H | first switch output setting |
| 4H | 8H | second switch output setting |

The actual data and the address designated by the address-designating means 54 are sent to the data output means 56 disposed at the downstream stage. The data output means 56 sets the supplied address to the eight address lines A0 to A7, and the flag is set for the write signal WR. The monitoring operation is performed until the flag for the read signal RD is returned from the control unit 28.

On the other hand, the control unit 28 receives, via the data-receiving means 60, the flag for the write signal WR from the communication unit 26 to read the values of the eight address lines A0 to A7. The address is sent to the data-storing means 62 disposed at the downstream stage. In this case, the address is 02H. Therefore, the data-storing means 62 recognizes that the low-order 8-bit concerning the minimum pressure is transmitted from the communication unit 26. At this stage, the data-receiving means 60 switches the data lines D0 to D7 into the input state, and the flag for the read signal RD is set.

The data output means 56 of the communication unit 26 transmits the low-order 8-bit (99H in this case) via the data lines D0 to D7 at the stage at which the flag for the read signal RD is received from the control unit 28.

The data-receiving means 60 of the control unit 28 receives the low-order 8-bit of the actual data via the data lines D0 to D7, and the data is transmitted to the data-storing means 62. The data-storing means 62 writes the low-order 8-bit (99H) into the storage region of the absolute address (ADD+2) in the internal memory 30.

Subsequently, the data output means 56 of the communication unit 26 sets the relative address (03H in this case) to the eight address lines A0 to A7 in order to send the high-order 8-bit of the actual data. The flag for the write signal WR is set. The monitoring operation is performed until the flag for the read signal RD is returned from the control unit 28.

The control unit 28 receives, via the data-receiving means 60, the flag for the write signal WR from the communication unit 26 to read the values of the eight address lines A0 to A7. The address is sent to the data-storing means 62 disposed at the downstream stage. In this case, the address is 03H. Therefore, the data-storing means 62 recognizes that the high-order 8-bit concerning the minimum pressure is transmitted from the communication unit 26. At this stage, the data-receiving means 60 switches the data lines D0 to D7 into the input state, and the flag for the read signal RD is set.

The data output means 56 of the communication unit 26 transmits the high-order 8-bit (01H in this case) via the data lines D0 to D7 at the stage at which the flag for the read signal RD is received from the control unit 28.

The data-receiving means 60 of the control unit 28 receives the high-order 8-bit of the actual data via the data lines D0 to D7, and the data is transmitted to the data-storing means 62. The data-storing means 62 writes the high-order 8-bit (01H) into the storage region of the absolute address (ADD+3) in the internal memory 30.

The communication unit 26 transfers the communication data from the data-receiving means 50 to the data-transmitting means 84 at the stage at which the writing into the internal memory 30 is completed. The data-transmitting means 84 updates the ID address of the transferred communication data by +1 to rewrite it into the returning communication data which is returned to the master station 12. The master station 12 recognizes the electropneumatic regulator system 10 for which the minimum pressure setting is completed, on the basis of the identification data and the ID address of the returned communication data. The master station 12 informs the user, for example, of the ID address of the electropneumatic regulator system 10 for which the minimum pressure setting is completed, via the output device 18.

Next, the maximum pressure setting will be briefly explained. At first, the user operates the input device 16 to input a value which indicates the maximum pressure and the ID address of the electropneumatic regulator system 10 for which the minimum pressure setting is completed. The input data is transmitted to the master station 12 via the serial communication bus 14. The data is converted into the communication data in the master station 12. In this case, the communication data has the SYNC code at its head followed by the ID address of the electropneumatic regulator system 10 designated by the user and the identification data "2H" indicating the maximum pressure setting added thereto and followed by the actual data "CCCH" indicating 0.8 MPa added thereto. The 16-bit array data represented by the identification data and the actual data is 2CCCH. The communication data is transmitted to each of the electropneumatic regulator systems 10 via the serial communication bus 14.

The same procedure as that described for the foregoing processing operation is carried out in the concerning electropneumatic regulator system 10 so that the maximum pressure is written into the internal memory 30 of the control unit 28 by the aid of the communication unit 26. In this case, the low-order 8-bit (CCH) is written into the absolute address (ADD+4) of the internal memory 30. The high-order 8-bit (0CH) is written into the absolute address (ADD+5) of the internal memory 30.

The communication unit 26 updates the ID address of the received communication data by +1 to rewrite it into the returning communication data which is returned to the master station 12. The master station 12 recognizes the electropneumatic regulator system 10 for which the maximum pressure setting is completed, on the basis of the identification data and the ID address of the returned communication data. The master station 12 informs the user of the electropneumatic regulator system 10 for which the maximum pressure setting is completed, via the output device 18.

Next, the first switch output setting will be briefly explained. At first, the user operates the input device 16 to input a value which indicates the first switch output P1 and the ID address of the electropneumatic regulator system for which the maximum pressure setting is completed. The input data is transmitted to the master station 12 via the serial communication bus 14. The data is converted into the communication data in the master station 12. In this case, the communication data has the SYNC code at its head followed by the ID address of the electropneumatic regulator system 10 designated by the user and the identification data "3H" indicating the first switch output setting added thereto and followed by the actual data "800H" indicating 0.5 MPa added thereto. The 16-bit array data represented by the identification data and the actual data is 3800H. The communication data is transmitted to each of the electropneumatic regulator systems 10 via the serial communication bus 14.

The same procedure as that described for the foregoing processing operation is carried out in the concerning electropneumatic regulator system 10 so that the first switch output P1 is written into the internal memory 30 of the control unit 28 by the aid of the communication unit 26. In this case, the low-order 8-bit (00H) is written into the absolute address (ADD+6) of the internal memory 30. The high-order 8-bit (08H) is written into the absolute address (ADD+7) of the internal memory 30.

The communication unit 26 updates the ID address of the received communication data by +1 to rewrite it into the returning communication data which is returned to the master station 12. The master station 12 recognizes the electropneumatic regulator system 10 for which the first switch output setting is completed, on the basis of the identification data and the ID address of the returned communication data. The master station 12 informs the user of the electropneumatic regulator system 10 for which the first switch output setting is completed, via the output device 18.

Next, the second switch output setting will be briefly explained. At first, the user operates the input device 16 to input a value which indicates the second switch output P2 and the ID address of the electropneumatic regulator system 10 for which the first switch output setting is completed. The input data is transmitted to the master station 12 via the serial communication bus 14. The data is converted into the communication data in the master station 12. In this case, the communication data has the SYNC code at its head followed by the ID address of the electropneumatic regulator system 10 designated by the user and the identification data "4H" indicating the second switch output setting added thereto and followed by the actual data "999H" indicating 0.6 MPa added thereto. The 16-bit array data represented by the identification data and the actual data is 4999H. The communication data is transmitted to each of the electropneumatic regulator systems 10 via the serial communication bus 14.

The same procedure as that described for the foregoing processing operation is carried out in the concerning electropneumatic regulator system 10 so that the second switch output P2 is written into the internal memory 30 of the control unit 28 by the aid of the communication unit 26. In this case, the low-order 8-bit (99H) is written into the absolute address (ADD+8) of the internal memory 30. The high-order 8-bit (09H) is written into the absolute address (ADD+9) of the internal memory 30.

The communication unit 26 updates the ID address of the received communication data by +1 to rewrite it into the returning communication data which is returned to the master station 12. The master station 12 recognizes the electropneumatic regulator system 10 for which the second switch output setting is completed, on the basis of the identification data and the ID address of the returned communication data. The master station 12 informs the user of the electropneumatic regulator system 10 for which the second switch output setting is completed, via the output device 18. The user confirms that the setting for the second switch output P2 is completed. At this stage, the initial setting is completed for one electropneumatic regulator system 10.

Next, explanation will be made with reference to FIG. 8 for the processing operation, especially for the process to be performed during the ordinary use of the electropneumatic regulator system 10 according to the embodiment of the present invention.

In the ordinary use, the pressure command of 0.55 MPa is transmitted. The switch output (ON or OFF) is monitored, and the secondary pressure is monitored in the window comparator mode. When the pressure range of 0 to 1.0 MPa is represented by 12-bit resolution, 1 bit corresponds to 0.2 kPa. Therefore, there is given 0.55 MPa=8CCH.

The user operates the input device 16 to input a target value which is given by the pressure command and the ID address of the electropneumatic regulator system 10 to which the data is sent. The input data is transmitted to the master station 12 via the serial communication bus 14. The data is converted into the communication data in the master station 12.

In this case, the communication data has the SYNC code at its head followed by the ID address of the electropneumatic regulator system 10 designated by the user and the identification data "0H" indicating the pressure command added thereto and followed by the actual data "8CCH" indicating 0.55 MPa added thereto. The 16-bit array data represented by the identification data and the actual data is 08CCH. The communication data is transmitted to each of electropneumatic regulator systems via the serial communication bus 14.

The master station 12 transmits the communication data to the respective electropneumatic regulator systems 10 via the serial communication bus 14. Each of the electropneumatic regulator systems 10 incorporates the transmitted communication data via the data-receiving means 50 of the communication unit 26, and it sends the data to the ID-collating means 52 disposed at the downstream stage. The ID-collating means 52 extracts the ID address contained in the incorporated communication data to make collation with the ID address individually registered. If it is judged that the ID addresses are not coincident with each other as a result of the collation, then the incorporation of the communication data is stopped, and the system waits for arrival of the next communication data.

On the other hand, if it is judged in the collation process effected by the ID-collating means 52 that the ID addresses are coincident with each other, the identification code and the actual data are sent to the address-designating means 54 disposed at the downstream stage. The address-designating means 54 designates the 8-bit address (the relative address) corresponding to the identification data (the pressure command), in the storage region of the internal memory 30. In this embodiment, 00H is designated as the relative address for the pressure command.

The actual data and the address designated by the address-designating means 54 are sent to the data output means 56 disposed at the downstream stage. The data output means 56 sets the sent address to the eight address lines A0 to A7, and the flag is set for the write signal WR. The monitoring operation is performed until the flag for the read signal RD is returned from the control unit 28.

On the other hand, the control unit 28 receives, via the data-receiving means 60, the flag for the write signal WR from the communication unit 26 to read the values of the eight address lines A0 to A7. The address is transmitted to the data-storing means 62 disposed at the downstream stage. In this case, the address is 00H. Therefore, the data-storing means 62 recognizes that the low-order 8-bit concerning the target pressure is transmitted from the communication unit 26. At this stage, the data-receiving means 60 switches the data lines D0 to D7 into the input state, and the flag for the read signal RD is set. The data output means 56 of the communication unit 26 transmits the low-order 8-bit (CCH in this case) via the data lines D0 to D7 at the stage at which the flag for the read signal RD is received from the control unit 28.

The data-receiving means 60 of the control unit 28 receives the low-order 8-bit of the actual data via the data lines D0 to D7, and the data is transmitted to the data-storing means 62. The data-storing means 62 writes the low-order 8-bit (CCH) into the storage region of the absolute address (ADD+0) in the internal memory 30.

Subsequently, the data output means 56 of the communication unit 26 sets the relative address (01H in this case) to the eight address lines A0 to A7 in order to send the high-order 8-bit of the actual data. The flag for the write signal WR is set. The monitoring operation is performed until the flag for the read signal RD is returned from the control unit 28.

The control unit 28 receives, via the data-receiving means 60, the flag for the write signal WR from the communication unit 26 to read the values of the eight address lines A0 to A7. The address is sent to the data-storing means 62 disposed at the downstream stage. In this case, the address is 01H. Therefore, the data-storing means 62 recognizes that the high-order 8-bit concerning the target pressure is transmitted from the communication unit 26. At this stage, the data-receiving means 60 switches the data lines D0 to D7 into the input state, and the flag for the read signal RD is set.

The data output means 56 of the communication unit 26 transmits the high-order 8-bit (08H in this case) via the data lines D0 to D7 at the stage at which the flag for the read signal RD is received from the control unit 28.

The data-receiving means 60 of the control unit 28 receives the high-order 8-bit of the actual data via the data lines D0 to D7, and the data is transmitted to the data-storing means 62. The data-storing means 62 writes the high-order 8-bit (08H) into the storage region of the absolute address (ADD+1) in the internal memory 30.

The control means 64 of the control unit 28 reads the 16-bit data (the target pressure) stored in 00H in the internal memory 30 to perform the feedback control on the basis of the value supplied from the pressure sensor 24 so that the secondary pressure is the target pressure (in this case, 0.55 MPa).

The control means 64 reads the values of the first and second switch outputs P1, P2 from the internal memory 30 to recognize the type of the setting mode on the basis of the values of the first and second switch outputs P1, P2 so that the switch output (ON or OFF) is given corresponding to the setting mode.

This embodiment assumes the window comparator mode. Therefore, if the value supplied from the pressure sensor 24 is less than the switch output P1, or if the value is more than the second switch output P2, then the control means 64 outputs OFF as the switch output. If the value supplied from the pressure sensor 24 is not less than the switch output P1, or if the value is not more than the second switch output P2, then the control means 64 outputs ON as the switch output.

The switch output and the value of the secondary pressure supplied from the pressure sensor 24 are transmitted to the control result-reading means 66. The control result-reading means 66 converts the read secondary pressure into 16-bit data to be written into the absolute address (ADD+10) in the internal memory 30. The control result-reading means 66 converts the received switch output ON/OFF into 1/0 bit information to be written into the absolute address (ADD+13) in the internal memory 30.

The control result output means 68 reads the secondary pressure (12-bit data) from (ADD+10) in the internal memory 30 and the result of switch output (4-bit data) from (ADD+13) at the stage at which the switch output and the secondary pressure are written into the internal memory 30 so that the data are combined.

For example, when the secondary pressure is 0.4 MPa (666H), the switch output is OFF. However, 0H is allotted to the switch output=OFF as shown in the data transmission format in FIG. 7. Therefore, the 16-bit combined data is 0666H. When the secondary pressure is 0.53 MPa (87AH), the switch output is ON (5H: see FIG. 7). Therefore, the 16-bit combined data is 587AH.

The control result output means 68 sets, for example, the high-order 8-bit of the 16-bit combined data to the address lines A0 to A7, and it sets the low-order 8-bit to the data lines D0 to D7. Further, the flag is set for the read signal RD.

The communication unit 26 receives the flag for the read signal RD from the control unit 28 by the aid of the control result-receiving means 80 to read the values of the address lines A0 to A7 and the values of the data lines D0 to D7. The read 16-bit data are transmitted to the communication data-preparing means 82 disposed at the downstream stage.

The communication data-preparing means 82 prepares the communication data on the basis of the supplied 16-bit data. In this embodiment, the communication data is prepared, which has the SYNC code at its head followed by the ID address of the concerning electropneumatic regulator system added thereto and followed by the 16-bit data supplied via the control result-receiving means 80 added thereto.

The prepared communication data is transmitted to the data-transmitting means 84. The data-transmitting means 84 updates the ID address of the transmitted communication data by +1 to rewrite the data into the returning communication data which is returned to the master station 12. The master station 12 recognizes the response (the switch output and the secondary pressure) of the electropneumatic regulator system 10 subjected to the pressure command, on the basis of the ID address, the identification data, and the secondary pressure of the returned communication data. The master station 12 outputs, via the output device 18, for example, the ID address, the switch output, and the secondary pressure of the electropneumatic regulator system 10 subjected to the pressure command.

The user can know the present value of the secondary pressure and the state of the switch output of the electropneumatic regulator system 10 subjected to the pressure command, on the basis of the result of output of the output device 18.

The secondary pressure and the switch output may be returned from the electropneumatic regulator system 10 subjected to the pressure command either periodically or at the point of time at which the switch output is changed. Alternatively, the secondary pressure and the switch output may be returned at the timing obtained by combining the above.

In the foregoing embodiment, explanation has been principally made for the processing operation in the window comparator mode. However, the same process is performed in other modes, i.e., in the hysteresis mode and in the self-diagnosis mode.

As described above, the electropneumatic regulator system 10 according to the embodiment of the present invention is constructed as follows. That is, the electropneumatic regulator system 10, which has the electropneumatic regulator 22 for controlling the pressure and the flow rate of the fluid supplied from the fluid source 22 on the basis of the level of the input signal Si, comprises the communication unit 26 for making communication with the master station 12, and the control unit 28 for controlling the electropneumatic regulator 22 in response to at least the contents of the communication data received by the communication unit 26. Therefore, one or more electropneumatic regulator systems 10 can be collectively controlled by means of the communication effected, for example, by the master station 12. It is possible to improve the response performance and reduce the cost for the remote control of the electropneumatic regulator system 10. As a result, it is possible to realize the multifunctional operation for various types of systems based on the use of the electropneumatic regulator 22. Further, the real time control can be easily performed for the system in which a large number of electropneumatic regulators 22 are dispersed therein.

Especially, in the embodiment of the present invention, the communication is made while adding, to the communication data, the identification data indicating the initial setting and the pressure command. Therefore, the following effects can be obtained.

That is, for example, the setting for the minimum pressure (the zero adjustment), the maximum pressure (the span adjustment), and the switch output has the feature that it is sufficient to perform the setting only once upon the start up of the electropneumatic regulator system 10. However, when it is intended to perform the setting for the above items in the serial communication, it is required to always perform the transmission of necessary amounts of information.

In other words, every time when the pressure command is transmitted, it is necessary to perform the transmission while adding the respective data concerning the minimum pressure, the maximum pressure, the first switch output, and the second switch output. This results in the increase in amount of data, and the cycle time of the controller is increased.

On the contrary, in the embodiment according to present invention, the 16-bit serial data contained in the communication data is used such that the amount of 4-bit is used to identify the data necessary to use the electropneumatic regulator system 10, and the remaining amount of 12-bit is used as the actual data. Therefore, the various types of initial setting can be performed only upon the start up of the electropneumatic regulator system 10 (upon the start of the program), and only the pressure command, which may be possibly changed successively, can be transmitted thereafter.

Further, the system of the present invention has the function to return the secondary pressure controlled by the electropneumatic regulator 22, and the system has the function to return the data containing the confirmation command for the various types of setting when the secondary pressure is returned. Therefore, it is possible to improve the correctness of the communication between the master station 12 and the respective electropneumatic regulator system 10.

It is a matter of course that the electropneumatic regulator system 10 according to the present invention is not limited to the embodiments described above, which may be embodied in other various forms without deviating the gist or essential characteristics of the present invention.

As described above, according to the electropneumatic regulator system concerning the present invention, it is possible to collectively control one or more electropneumatic regulators by using, for example, a master station on the basis of the communication so that the response performance may be improved for the remote control of the electropneumatic regulators, and the cost may be reduced.

What is claimed is:

1. An electropneumatic regulator system comprising an electropneumatic regulator for controlling a pressure and a flow rate of a fluid supplied from a fluid source on the basis of a level of an input electric signal, said electropneumatic regulator system comprising:

a communication unit configured to communicate with an external device; and a control unit configured to control said electropneumatic regulator depending on at least contents of communication data received by said communication unit, wherein said communication unit designates a plurality of addresses corresponding to setting attributes contained in said communication data so that identification data and actual data contained in said communication data are transmitted to said control unit; and wherein said control unit is further configured to store said actual data at said addresses designated by said communication unit on the basis of said identification data in a storage region in a memory so that said electropneumatic regulator is controlled on the basis of said actual data stored in said memory.

2. The electropneumatic regulator system according to claim 1, wherein when said electropneumatic regulator is subjected to initial setting, said control unit performs said initial setting for said electropneumatic regulator on the basis of said actual data stored in said address concerning said initial setting in said storage region in said memory.

3. The electropneumatic regulator system according to claim 1, wherein when said electropneumatic regulator is subjected to ordinary use, said control unit controls said electropneumatic regulator on the basis of said actual data stored in said address concerning a target value in said storage region in said memory.

4. An electropneumatic regulator system comprising an electropneumatic regulator for controlling a pressure and a flow rate of a fluid supplied from a fluid source on the basis of a level of an input electric signal, said electropneumatic regulator system comprising:

a communication unit configured to communicate with an external device; and a control unit configured to control said electropneumatic regulator depending on at least contents of communication data received by said communication unit, wherein said control unit is further configured to receive a result of control effected by said electropneumatic regulator and to store the received result of control at a predetermined address in a storage region in a memory, and wherein said communication unit is further configured to read said result of control stored at said predetermined address and to prepare communication data corresponding to said result of control for transmission to said external device.

5. The electropneumatic regulator system according to claim 4, wherein said proposed communication data corresponding to said result of control is transmitted to said external device periodically or in response to an external request.

6. An electropneumatic regulator system comprising an electropneumatic regulator for controlling a pressure and a flow rate of a fluid supplied from a fluid source on the basis of a level of an input electric signal, said electropneumatic regulator system comprising:

a communication unit configured to communicate with an external device; and a control unit configured to control said electropneumatic regulator depending on at least contents of communication data received by said communication unit, wherein said communication unit designates an address corresponding to a setting attribute contained in said communication data so that actual data contained in said communication data is transmitted to said control unit, and wherein said control unit is further configured to store said actual data at said address designated by said communication unit in a storage region in a memory so that said electropneumatic regulator is controlled on the basis of actual data stored in said memory, and wherein said communication unit comprises, a data-receiving means for receiving said communication data from said external device, an address-designating means for designating said address corresponding to said setting attribute contained in said received communication data, and a data output means for transmitting said designated address and said actual data to said control unit, and wherein said control unit comprises, a data-receiving means for receiving said designated address and said actual data from said communication unit, a data-storing means for storing said actual data at said designated address in said storage region in said memory, and a control means for controlling said electropneumatic regulator on the basis of said actual data stored in said memory.

7. The electropneumatic regulator system according to claim 6, wherein said control unit further comprises:

a control result-reading means for reading a result of control effected by said electropneumatic regulator to store it at a predetermined address in said memory; and a control result output means for reading said result of control from said memory to transmit it to said communication unit, and wherein said communication unit further comprises,
 a control result-receiving means for receiving said result of control transmitted from said control result output means,
 a communication data-preparing means for preparing communication data corresponding to said received result of control, and
 a data-transmitting means for transmitting said prepared communication data to said external device.

8. The electropneumatic regulator system according to claim 1, wherein said external device is connected to said communication unit via a serial communication bus.

9. The electropneumatic regulator system according to claim 8, wherein:

an identification code for indicating said individual electropneumatic regulator is contained in communication data transmitted from said external device; and said communication unit receives said communication data when said identification code contained in said communication data coincides with said identification code of said electropneumatic regulator.

10. The electropneumatic regulator system according to claim 9, wherein said communication unit performs serial/parallel conversion for said communication data transmitted from said external device to process said data, and said communication unit performs serial/parallel conversion for communication data prepared in said communication unit to transmit it to said external device.

* * * * *